US 11,433,948 B2

(12) United States Patent
Ishioka et al.

(10) Patent No.: US 11,433,948 B2
(45) Date of Patent: Sep. 6, 2022

(54) VEHICLE PILLAR STRUCTURE

(71) Applicant: TOYOTA JIDOSHA KABUSHIKI KAISHA, Aichi-ken (JP)

(72) Inventors: Hirotaka Ishioka, Toyota (JP);
Yasuhiro Hara, Nagoya (JP);
Norimasa Koreishi, Miyoshi (JP);
Jumpei Watanabe, Nagakute (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/156,633

(22) Filed: Jan. 25, 2021

(65) Prior Publication Data

US 2021/0245814 A1    Aug. 12, 2021

(30) Foreign Application Priority Data

Feb. 10, 2020    (JP) .............................. JP2020-020947

(51) Int. Cl.
*B62D 25/04*    (2006.01)
*B62D 31/02*    (2006.01)

(52) U.S. Cl.
CPC ............. *B62D 25/04* (2013.01); *B62D 31/02* (2013.01)

(58) Field of Classification Search
CPC ... B60J 1/002; B60J 1/004; B60J 1/08; B62D 25/04; B62D 25/08; B62D 31/02

USPC ............ 296/84.1, 178, 96.12, 96.21, 193.06, 296/203.01, 203.02
See application file for complete search history.

(56) References Cited

U.S. PATENT DOCUMENTS

| 2009/0267330 | A1 | 10/2009 | Glaser et al. |
| 2018/0273103 | A1 | 9/2018 | Komoriya et al. |
| 2018/0273106 | A1* | 9/2018 | Ikeda .......................... B60J 1/02 |
| 2019/0144042 | A1 | 5/2019 | Sakabe et al. |

FOREIGN PATENT DOCUMENTS

| EP | 1227032 A2 * | 7/2002 | ........... B62D 31/025 |
| EP | 3511230 A1 | 7/2019 | |
| JP | 2018162021 A | 10/2018 | |

* cited by examiner

*Primary Examiner* — Dennis H Pedder
(74) *Attorney, Agent, or Firm* — Hauptman Ham, LLP

(57) ABSTRACT

A vehicle pillar structure includes a vehicle pillar and a transparent window member. The vehicle pillar includes a first pillar extending along an outer end of a windshield glass in a width direction of a vehicle, and a second pillar disposed away from the first pillar by a predetermined distance in a substantial front-and-rear direction of the vehicle. An outside of the vehicle is viewable through the transparent window member. The transparent window member is interposed between the first pillar and the second pillar, and covers an opening defined by the first pillar and the second pillar. The vehicle pillar has a curved shape defined by a straight portion extending in a substantial vertical direction of the vehicle in side view, and a curved portion curved from an upper end of the straight portion and extending in the front-and-rear direction of the vehicle.

13 Claims, 4 Drawing Sheets

VEHICLE PILLAR STRUCTURE

CROSS-REFERENCE TO RELATED APPLICATION

This application claims priority to Japanese Patent Application No. 2020-020947 filed on Feb. 10, 2020, incorporated herein by reference in its entirety.

BACKGROUND

1. Technical Field

The present disclosure relates to a vehicle pillar structure.

2. Description of Related Art

In a vehicle pillar structure described in Japanese Unexamined Patent Application Publication No. 2018-162021 (JP 2018-162021 A), vehicle pillars each including a first pillar and a second pillar arranged away from each other in a front-and-rear direction of a vehicle are arranged at a front part of the vehicle. In this vehicle pillar, a transparent window member is interposed between the first pillar and the second pillar to cover an opening defined by the first pillar and the second pillar. Therefore, an occupant seated on a driver's seat can view the outside of the vehicle through the transparent window member at the opening of the vehicle pillar. Thus, the visibility of the occupant is improved.

SUMMARY

In the technology described in JP 2018-162021 A, the vehicle pillar has a straight shape, and is inclined toward the rear of the vehicle with decreasing distance to the top of the vehicle. Therefore, the distance between a front windshield glass and an occupant in a vehicle cabin decreases as the distance to the top of the vehicle decreases from any part of the vehicle pillar. Thus, the related art has room for improvement toward a wider vehicle cabin space so that the occupant in the vehicle cabin has a sense of openness to a higher degree.

The present disclosure provides a vehicle pillar structure with which the visibility of an occupant can be improved and a vehicle cabin space can be increased.

A vehicle pillar structure according to one aspect of the present disclosure includes a vehicle pillar and a transparent window member. The vehicle pillar includes a first pillar and a second pillar. The first pillar extends along an outer end of a windshield glass in a width direction of a vehicle. The second pillar is disposed away from the first pillar by a predetermined distance in a substantial front-and-rear direction of the vehicle. An outside of the vehicle is viewable through the transparent window member. The transparent window member is interposed between the first pillar and the second pillar, and covers an opening defined by the first pillar and the second pillar. The vehicle pillar has a curved shape defined by a straight portion and a curved portion. The straight portion extends in a substantial vertical direction of the vehicle in side view. The curved portion is curved from an upper end of the straight portion, and extends in the front-and-rear direction of the vehicle.

According to the aspect described above, an occupant in a vehicle cabin at a front part or a rear part of the vehicle can view the outside of the vehicle through the transparent window member at the opening of the vehicle pillar. Therefore, a blind spot of the vehicle pillar is reduced for the occupant in the vehicle cabin. Thus, the visibility is improved.

The vehicle pillar has the curved shape defined by the straight portion extending in the substantial vertical direction of the vehicle in side view, and the curved portion curved from the upper end of the straight portion and extending in the front-and-rear direction of the vehicle. Since the upper part of the vehicle pillar extends in the front-and-rear direction of the vehicle by the curved portion, the vehicle cabin space can be increased as compared to a vehicle pillar inclined in a straight shape in side view.

In the aspect described above, the curved portion may be integrated with a roof side rail, the roof side rail constituting a framework of a roof serving as a ceiling of a vehicle cabin of the vehicle and disposed at an outer end of the roof in the width direction of the vehicle to extend in the front-and-rear direction of the vehicle.

According to the structure described above, the vehicle pillar is integrated with the roof side rail. Therefore, a load input to the vehicle pillar in the event of, for example, front-end or rear-end collision of the vehicle can efficiently be transmitted to the roof side rail and the roof.

In the aspect described above, a first reinforcement member that couples the first pillar and the second pillar together may be provided at a boundary between the straight portion and the curved portion.

According to the structure described above, the vehicle pillar is curved at the boundary between the straight portion and the curved portion. Therefore, a stress caused by the load input in the event of front-end or rear-end collision of the vehicle concentrates on this boundary.

The first reinforcement member that couples the first pillar and the second pillar together is provided at the boundary between the straight portion and the curved portion. Therefore, the vehicle pillar is structured such that the first reinforcement member effectively reinforces the part where the stress concentrates in the event of front-end or rear-end collision of the vehicle. Thus, deformation of the vehicle pillar is suppressed in the event of front-end or rear-end collision of the vehicle.

In the aspect described above, one end of a roof header may be coupled to a boundary between the straight portion and the curved portion. The roof header constitutes a framework of the roof serving as a ceiling of a vehicle cabin of the vehicle, and is disposed at an outer end of the roof in the front-and-rear direction of the vehicle to extend in the width direction of the vehicle.

According to the structure described above, the vehicle pillar is effectively reinforced by coupling the roof header to the part of the vehicle pillar where the stress concentrates in the event of front-end or rear-end collision of the vehicle. Thus, the deformation of the vehicle pillar is suppressed in the event of front-end or rear-end collision of the vehicle.

In the aspect described above, a middle part of the first pillar and a lower part of the second pillar may be coupled together by a second reinforcement member. The lower part of the second pillar may be disposed so as to be offset outward in the width direction of the vehicle with respect to the middle part of the first pillar.

According to the structure described above, the load input to the lower part of the vehicle pillar in the event of front-end or rear-end collision of the vehicle is distributed to the first pillar and the second pillar via the second reinforcement member. The lower part of the second pillar is disposed so as to be offset outward in the width direction of the vehicle with respect to the middle part of the first pillar. Therefore, the load input to the vehicle pillar in the event of front-end or rear-end collision of the vehicle can be distributed outward in the width direction of the vehicle. Thus, deformation at the front or rear of the vehicle is suppressed in the event of front-end or rear-end collision of the vehicle.

In the aspect described above, a framework member may be disposed on an inner side of the vehicle pillar in the front-and-rear direction of the vehicle. The framework member includes a vertical pillar portion extending in the vertical direction of the vehicle. The vertical pillar portion may constitute a side part of the framework member in the width direction of the vehicle. An upper end of the first pillar and an upper end of the second pillar may be coupled to the vertical pillar portion.

According to the structure described above, the load input to the vehicle pillar in the event of front-end or rear-end collision of the vehicle is transmitted to the framework member disposed on the inner side in the front-and-rear direction of the vehicle. Thus, the rigidity and strength of the vehicle pillar can be increased.

In the aspect described above, a lower part of the second pillar may be coupled to the vertical pillar portion of the framework member via a third reinforcement member.

According to the structure described above, the load input to the lower part of the second pillar of the vehicle pillar in the event of front-end or rear-end collision of the vehicle is transmitted to the vertical pillar portion of the framework member via the third reinforcement member. Thus, deformation of the second pillar and deformation at the front or rear of the vehicle are suppressed in the event of front-end or rear-end collision of the vehicle.

In the aspect described above, the framework member may have an annular shape when viewed in the front-and-rear direction of the vehicle. The annular shape may be defined by a pair of the vertical pillar portions and a reinforcement portion that couples upper ends of the pair of the vertical pillar portions together in the width direction of the vehicle and couples lower ends of the pair of the vertical pillar portions together in the width direction of the vehicle.

According to the structure described above, the framework member has the annular shape when viewed in the front-and-rear direction of the vehicle, and the rigidity and strength are increased. Thus, the rigidity and strength of the vehicle pillar can further be increased, thereby contributing to suppression of deformation in the event of front-end or rear-end collision of the vehicle.

In the aspect described above, a sectional area of the curved portion may be larger than a sectional area of the straight portion.

According to the aspect of the present disclosure, the vehicle pillar structure according to the present disclosure has an advantageous effect that the visibility of the occupant can be improved and the vehicle cabin space can be increased.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Overall Structure

Figure 1:
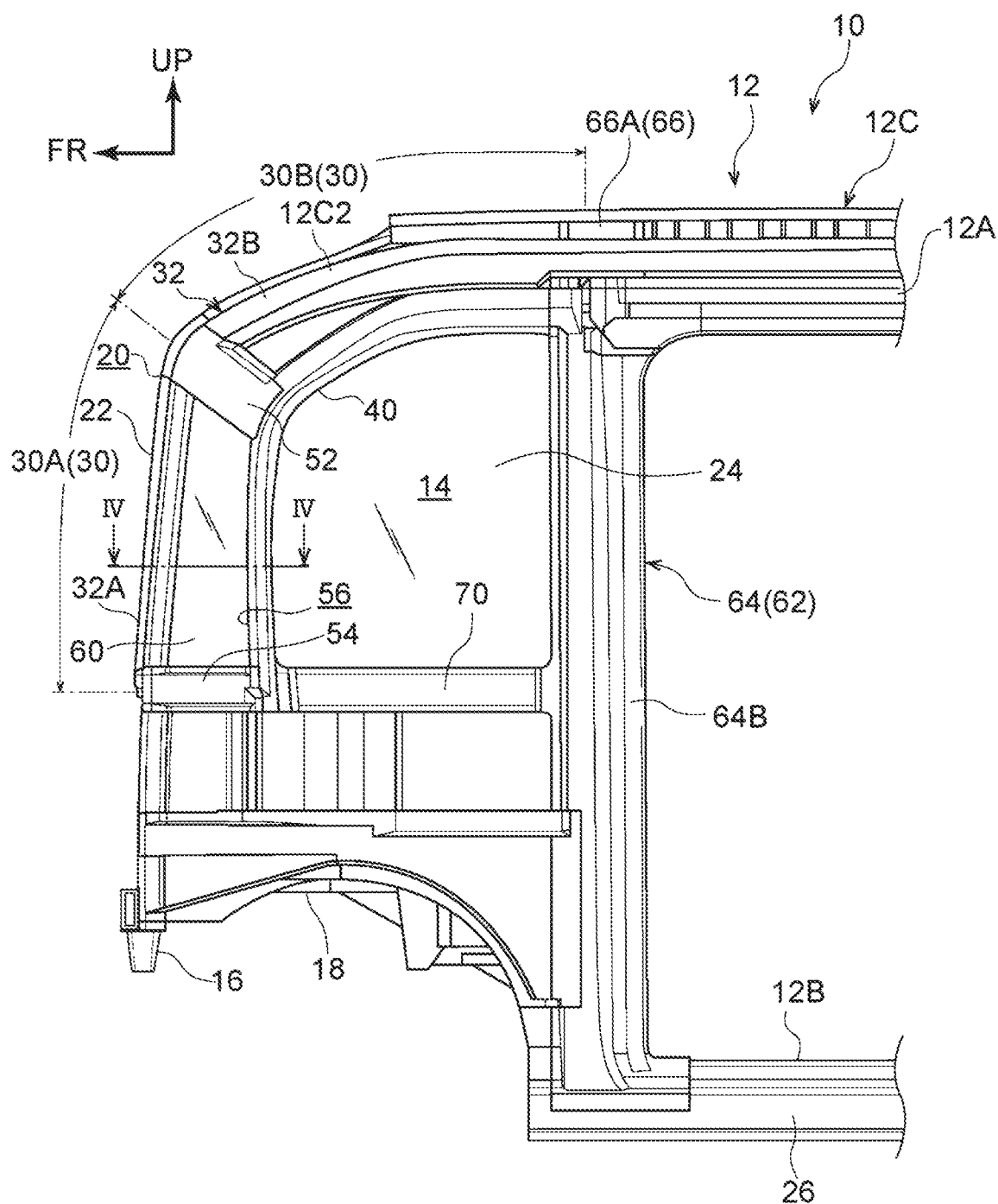
FIG. 1 is a side view of a vehicle to which a vehicle pillar structure according to an embodiment is applied.

A vehicle 10 to which a vehicle pillar structure according to an embodiment is applied is described below with reference to FIG. 1 to FIG. 4. An arrow FR shown as appropriate in the drawings indicates a front side of the vehicle. An arrow UP shown as appropriate in the drawings indicates a top side of the vehicle. An arrow LH shown as appropriate in the drawings indicates a left side of the vehicle. Unless otherwise specified, terms "front", "rear", "up", "down", "right", and "left" as used in the following description mean the front and rear in a front-and-rear direction of the vehicle, the top and bottom in a vertical direction of the vehicle, and the right and left in a case where the vehicle is oriented in a traveling direction.

As partially illustrated in FIG. 1, the vehicle 10 includes a frame structure (not illustrated) and a body 12. The frame structure is arranged at a lower part of the vehicle 10 to serve as a framework member at the lower part of the vehicle. The body 12 is fixed onto the frame structure.

The body 12 is formed into a substantially rectangular parallelepiped shape that is long in the front-and-rear direction of the vehicle. The body 12 includes a pair of right and left side walls 12A, a floor 12B, and a roof 12C. The floor 12B is interposed between the side walls 12A in a width direction of the vehicle to serve as a floor surface of a vehicle cabin 14. The roof 12C serves as a ceiling of the vehicle cabin 14. In this embodiment, a vehicle seat (not illustrated) is provided as a driver's seat in the vehicle cabin 14 on a front side of the vehicle and at a center in the width direction of the vehicle.

Figure 2:
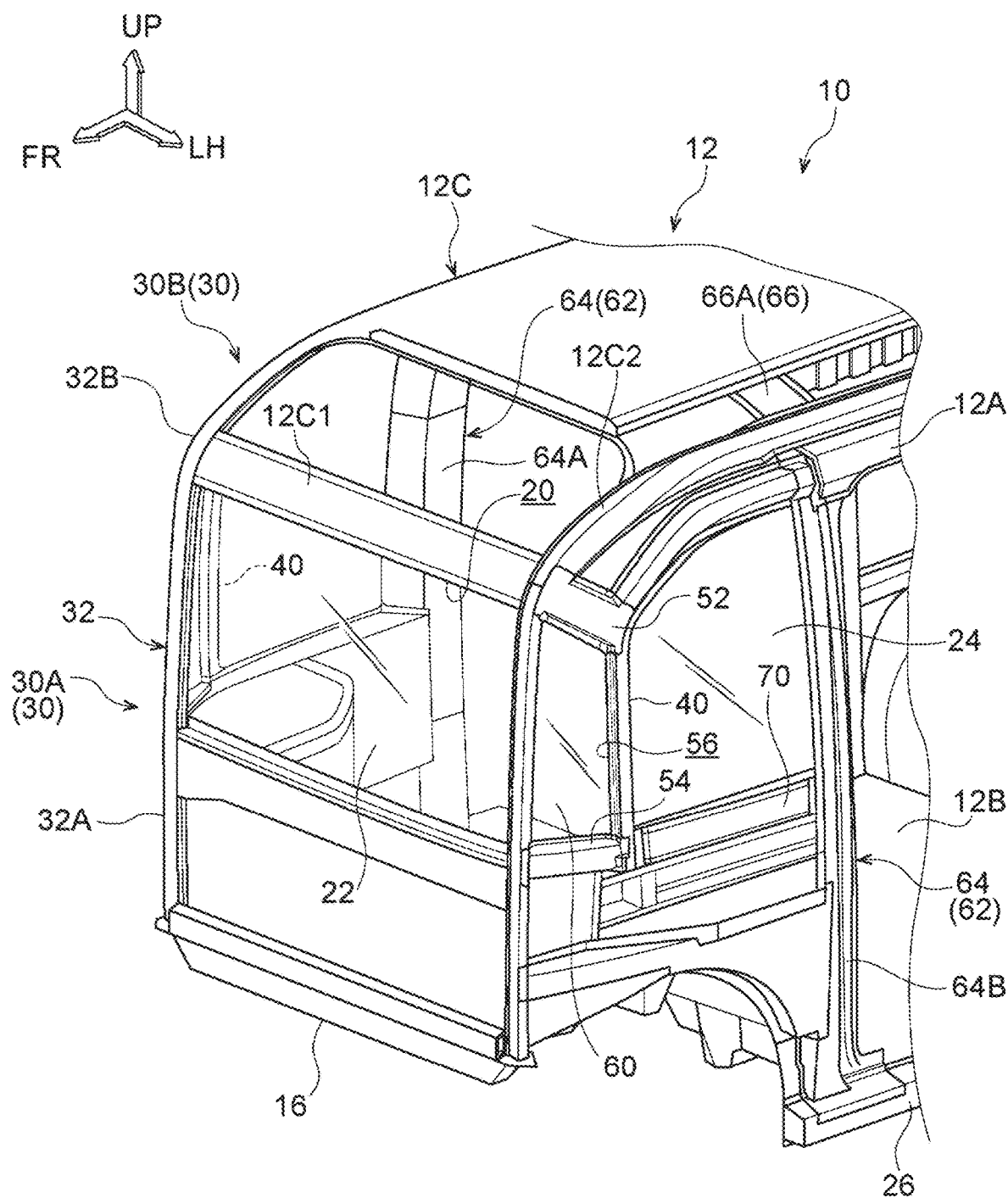
FIG. 2 is a perspective view of the vehicle of FIG. 1 that is obliquely viewed from a front side of the vehicle.

As illustrated in FIG. 1 and FIG. 2, a front windshield glass 22 (hereinafter referred to as "Fr glass 22") is provided at a front part of the vehicle cabin 14 to cover an opening 20 defined at the front of the vehicle 10. The Fr glass 22 is a transparent window member fixed to the opening 20, and separates the inside and outside of the vehicle cabin 14. The thickness direction of the Fr glass 22 is the front-and-rear direction of the vehicle (substantial front-and-rear direction of the vehicle). The Fr glass 22 extends in the width direction and the vertical direction of the vehicle, and is slightly inclined toward the rear of the vehicle with decreasing distance to the top of the vehicle in side view. The Fr glass 22 corresponds to an example of a "windshield glass" of the present disclosure.

The upper end of the Fr glass 22 is connected to a roof header 12C1 extending in the width direction of the vehicle to define an upper edge of the opening 20. The roof header 12C1 constitutes a part of a framework of the roof 12C, and is arranged at the front end of the roof 12C. For example, the roof header 12C1 is a reinforcement member whose vertical sectional shape is a closed sectional shape, and extends along the width direction of the vehicle. The lower end of the Fr glass 22 is connected to a cowl (reference symbol is omitted) extending in the width direction of the vehicle to define a lower edge of the opening 20.

The Fr glass 22 has a constant thickness, and has a gently curved shape so that a middle part of the Fr glass 22 in the width direction of the vehicle projects to the front side of the vehicle. A pair of right and left pillars 30 serving as vehicle pillars is provided on an outer side of the Fr glass 22 in the width direction of the vehicle.

Vehicle Pillar

Each of the right and left pillars 30 has a curved shape having a curved part above the middle in its extending direction and projecting to the front side and the top side of the vehicle in side view. The lower part of the pillar 30 is a straight portion 30A. The straight portion 30A extends in the vertical direction of the vehicle (substantial vertical direction of the vehicle) along an outer end of the Fr glass 22 in the width direction of the vehicle. The upper part of the pillar 30 is a curved portion 30B. The curved portion 30B is gently curved from the upper end of the straight portion 30A, and extends substantially toward the rear of the vehicle (in the front-and-rear direction of the vehicle). Although the left pillar 30 in the width direction of the vehicle is described below, the right pillar 30 in the width direction of the vehicle has a similar structure.

The pillar 30 includes a first pillar 32 that constitutes a front part of the pillar 30, and a second pillar 40 that constitutes a rear part of the pillar 30. The pillar 30 further includes a first reinforcement member 52 and a second reinforcement member 54 that couple the first pillar 32 and the second pillar 40 together in the front-and-rear direction of the vehicle.

First Pillar

As illustrated in FIG. 1, the first pillar 32 has a curved shape having a curved part above the middle in its extending direction and projecting to the front side and the top side of the vehicle in side view. The first pillar 32 has a lower pillar portion 32A that constitutes the straight portion 30A of the pillar 30. The lower pillar portion 32A is constituted by a first outer pillar portion 34 and a first inner pillar portion 36 described later. The first pillar 32 also has an upper pillar portion 32B that constitutes the curved portion 30B of the pillar 30. The upper pillar portion 32B is constituted by the front end of a roof side rail 12C2 of the roof 12C. That is, the pillar 30 is integrated with the roof side rail 12C2 of the vehicle 10 such that the front end of the roof side rail 12C2 serves as a part of the first pillar 32.

Figure 4:
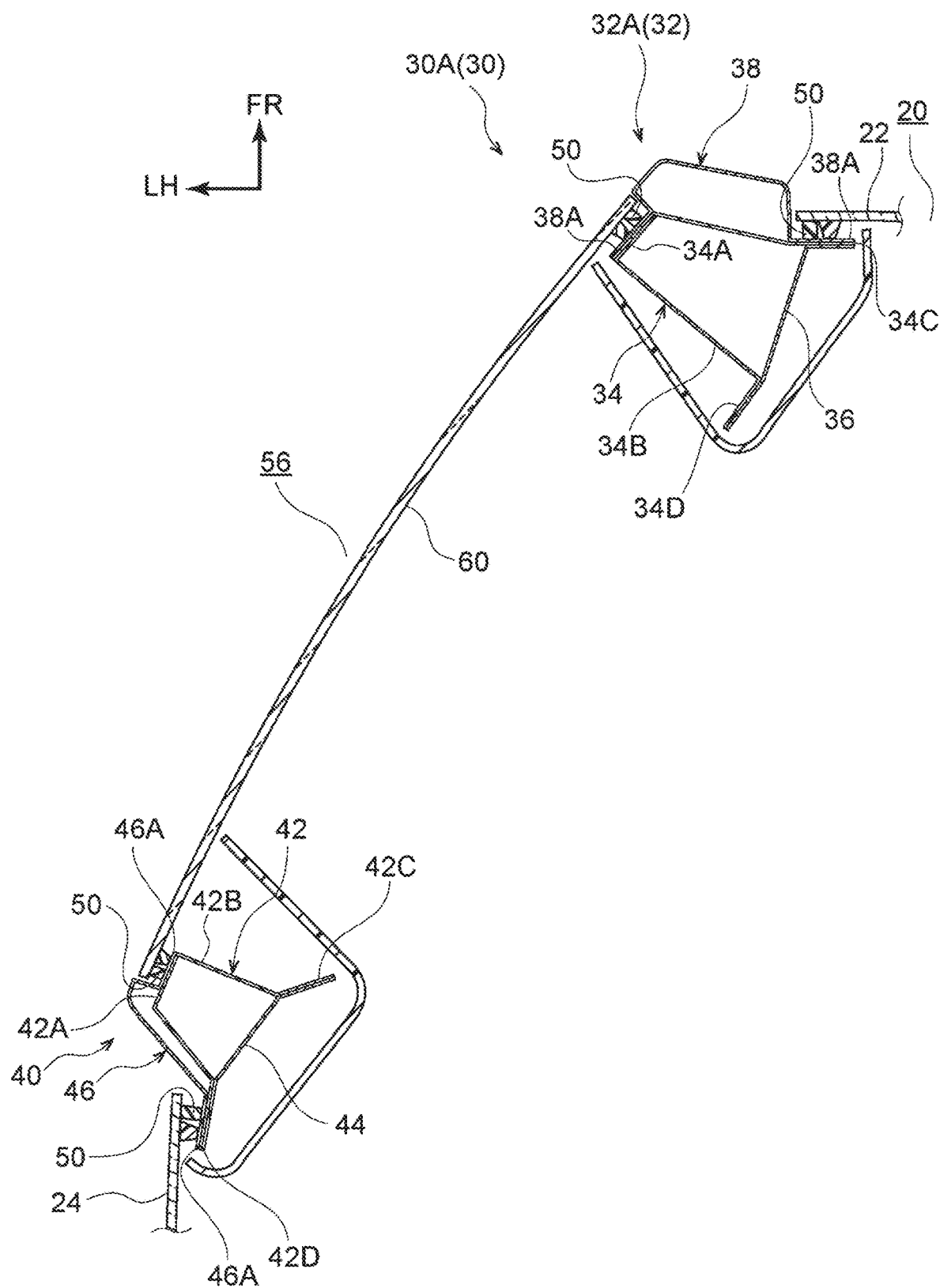
FIG. 4 is an enlarged plane sectional view of a pillar, illustrating an enlarged portion cut along a line IV-IV in FIG. 1.

FIG. 4 is a plane sectional view illustrating a state in which the straight portion 30A of the pillar 30 is cut along a line IV-IV in FIG. 1 in a direction orthogonal to the extending direction (vertical direction of the vehicle).

As illustrated in FIG. 4, the sectional shape of the lower pillar portion 32A of the first pillar 32 is a closed sectional shape defined by the first outer pillar portion 34 and the first inner pillar portion 36. The first outer pillar portion 34 is made of a steel sheet, and has a substantially hat-shaped cross section open to the vehicle cabin 14. Referring to FIG. 4, the first outer pillar portion 34 includes an outer side wall 34A and a pair of side walls 34B. The outer side wall 34A faces outside in the width direction of the vehicle. The side walls 34B extend inward in the width direction of the vehicle from the front end and the rear end of the outer side wall 34A, and face each other in the front-and-rear direction of the vehicle. A front flange 34C is formed at the distal end of the side wall 34B on the front side of the vehicle. A rear flange 34D is formed at the distal end of the side wall 34B on the rear side of the vehicle.

The first inner pillar portion 36 is made of a steel sheet, and the sectional shape is substantially a crank shape. The first inner pillar portion 36 closes the opening of the first outer pillar portion 34 from the vehicle cabin 14 side. The front end and the rear end of the first inner pillar portion 36 are joined to the front flange 34C and the rear flange 34D of the first outer pillar portion 34, respectively. Thus, the lower pillar portion 32A of the first pillar 32 has a closed section structure defined by the first outer pillar portion 34 and the first inner pillar portion 36.

A first outer panel 38 is arranged on a front side of the first outer pillar portion 34 in the front-and-rear direction of the vehicle to serve as an outer design surface of the lower pillar portion 32A. The first outer panel 38 substantially has a U-shape open to the rear of the vehicle, and covers the side wall 34B of the first outer pillar portion 34 on the front side of the vehicle from the outside of the vehicle cabin 14. First attachment flanges 38A are formed at the open end of the first outer panel 38 to extend away from each other. The first attachment flanges 38A are joined to the outer side wall 34A and the front flange 34C of the first outer pillar portion 34 from the outside of the vehicle cabin 14. Thus, a closed section structure is defined by the first outer pillar portion 34 and the first outer panel 38.

The outer end of the Fr glass 22 in the width direction of the vehicle is joined, via a water-stop sealer 50, to the first attachment flange 38A joined to the front flange 34C. The front end of a transparent window member 60 described later in the front-and-rear direction of the vehicle is joined, via a water-stop sealer 50, to the first attachment flange 38A joined to the outer side wall 34A.

Figure 3:
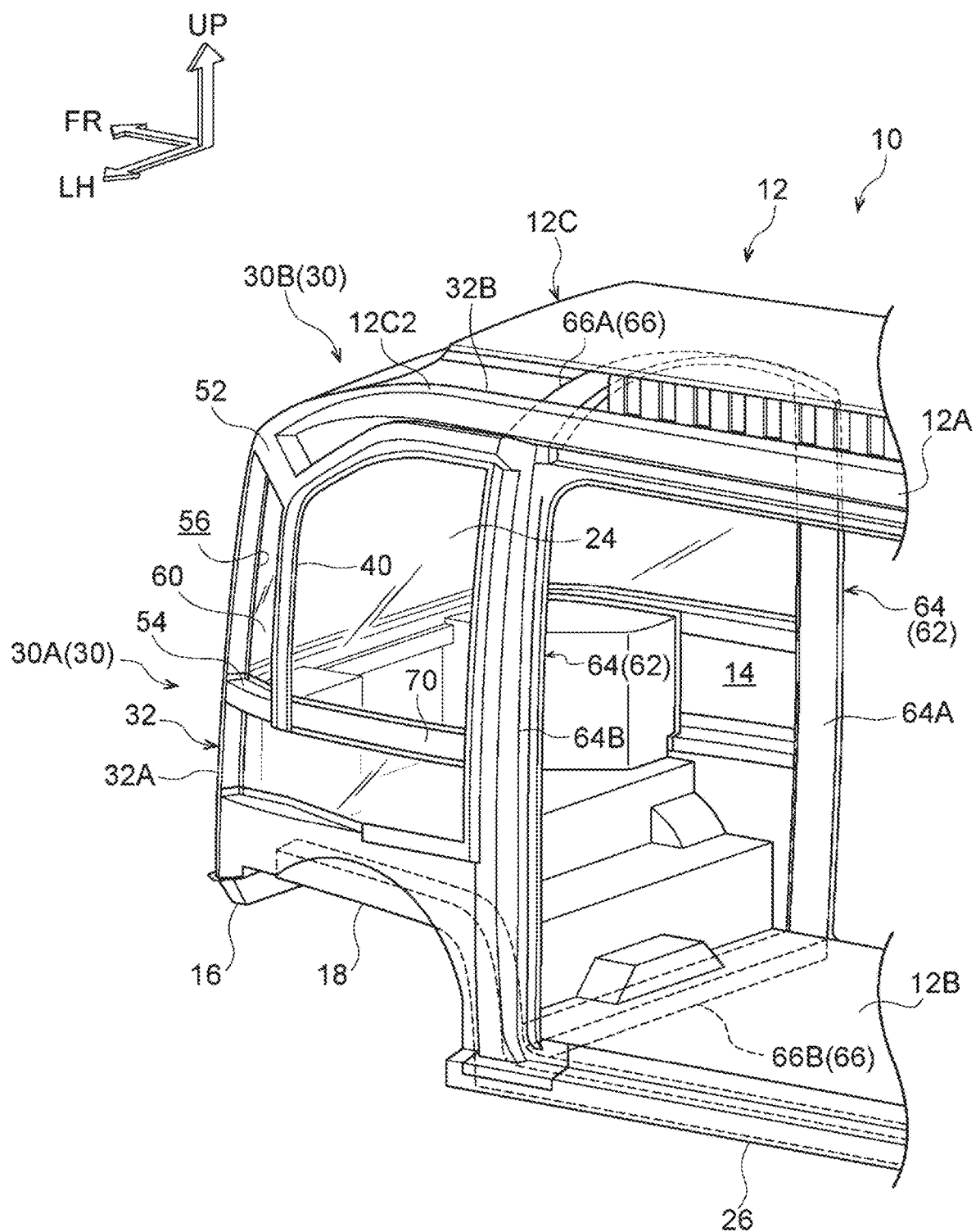
FIG. 3 is a perspective view of the vehicle of FIG. 1 that is obliquely viewed from a rear side of the vehicle.

As illustrated in FIG. 1 and FIG. 3, the lower end of the lower pillar portion 32A is coupled to a bumper reinforcement 16 via a gusset (reference symbol is omitted). The bumper reinforcement 16 is a part of the frame structure serving as the framework member at the lower part of the vehicle, and extends in an elongated shape so that the width direction of the vehicle is a longitudinal direction. Both longitudinal ends of the bumper reinforcement 16 are fixed to the front ends (outer ends in the front-and-rear direction of the vehicle) of a pair of right and left side members 18 arranged away from each other in the width direction of the vehicle. Each side member 18 is a part of the frame structure serving as the framework member at the lower part of the vehicle, and the side member 18 extends in the front-and-rear direction of the vehicle that is a longitudinal direction. The bumper reinforcement 16 supports a front bumper (not illustrated) of the vehicle 10 from the rear side of the vehicle.

The upper end of the lower pillar portion 32A is coupled to the front end of the roof side rail 12C2 (outer end in the front-and-rear direction of the vehicle) that constitutes the upper pillar portion 32B. The roof side rail 12C2 constitutes the framework of the roof 12C, and is arranged at the outer end of the roof 12C in the width direction of the vehicle to extend in the front-and-rear direction of the vehicle. Similarly to the lower pillar portion 32A, the vertical sectional shape of the roof side rail 12C2 is a closed sectional shape, and the roof side rail 12C2 includes an outer roof side portion and an inner roof side portion (reference symbols are omitted). The outer roof side portion is arranged on an outer side in the width direction of the vehicle. The inner roof side portion is arranged on an inner side in the width direction of the vehicle with respect to the outer roof side portion. The sectional area of the closed section of the front end of the roof side rail 12C2 (upper pillar portion 32B) is set larger than the sectional area of the closed section of the lower pillar portion 32A. Therefore, in the first pillar 32, the upper pillar portion 32B near the ceiling of the vehicle cabin 14 is thicker than the lower pillar portion 32A near the height of a line of sight of an occupant in the vehicle cabin 14. Further, the sectional rigidity of the upper pillar portion 32B is set higher than the sectional rigidity of the lower pillar portion 32A.

The lower pillar portion 32A and the roof side rail 12C2 are coupled together by joining their joint flanges (not illustrated). One end of the roof header 12C1 in its extending direction is coupled to the part where the lower pillar portion 32A and the upper pillar portion 32B are coupled together. Thus, a framework structure having an annular shape when viewed in the front-and-rear direction of the vehicle is formed at the front (and rear) of the vehicle 10 by the roof header 12C1, the bumper reinforcement 16, and the pair of right and left first pillars 32.

Second Pillar

Similarly to the first pillar 32, the second pillar 40 that constitutes the rear part of the pillar 30 in the front-and-rear direction of the vehicle has a curved shape projecting to the front side and the top side of the vehicle in side view. The second pillar 40 includes a second outer pillar portion 42 and a second inner pillar portion 44. The second outer pillar portion 42 is arranged on an outer side in the width direction of the vehicle. The second inner pillar portion 44 is arranged on an inner side in the width direction of the vehicle with respect to the second outer pillar portion 42.

As illustrated in FIG. 1, the second pillar 40 is arranged away from the first pillar 32 by a predetermined distance in the front-and-rear direction of the vehicle. More specifically, the upper end of the second pillar 40 is arranged near the upper end of the first pillar 32. The distance between the second pillar 40 and the first pillar 32 gradually increases in the front-and-rear direction of the vehicle (substantial front-and-rear direction of the vehicle) with decreasing distance from the upper end to the lower end. The lower part of the second pillar 40 is offset outward in the width direction of the vehicle with respect to the middle part of the first pillar 32 (see FIG. 3).

As illustrated in FIG. 4, the sectional shape of the second pillar 40 is a closed sectional shape defined by the second outer pillar portion 42 and the second inner pillar portion 44. The second outer pillar portion 42 is made of a steel sheet, and has a substantially hat-shaped cross section open to the vehicle cabin 14. Referring to the plane section illustrated in FIG. 4, the second outer pillar portion 42 includes an outer side wall 42A and a pair of side walls 42B. The outer side wall 42A faces outside in the width direction of the vehicle. The side walls 42B extend inward in the width direction of the vehicle from the front end and the rear end of the outer side wall 42A, and face each other in the front-and-rear direction of the vehicle. A front flange 42C is formed at the distal end of the side wall 42B on the front side of the vehicle. A rear flange 42D is formed at the distal end of the side wall 42B on the rear side of the vehicle.

The second inner pillar portion 44 is made of a steel sheet, and the sectional shape is substantially a crank shape. The second inner pillar portion 44 closes the opening of the second outer pillar portion 42 from the vehicle cabin 14 side. The front end and the rear end of the second inner pillar portion 44 are joined to the front flange 42C and the rear flange 42D of the second outer pillar portion 42, respectively. Thus, the second pillar 40 has a closed section structure defined by the second outer pillar portion 42 and the second inner pillar portion 44. Similarly to the first pillar 32, the sectional area of the closed section of the part that constitutes the curved portion 30B of the pillar 30 is set larger than the sectional area of the closed section of the part that constitutes the straight portion 30A of the pillar 30.

A second outer panel 46 is arranged on a rear side of the second outer pillar portion 42 in the front-and-rear direction of the vehicle to serve as an outer design surface of the second pillar 40. The second outer panel 46 substantially has a U-shape open to the front of the vehicle, and covers the side wall 42B of the second outer pillar portion 42 on the rear side of the vehicle from the outside of the vehicle cabin 14. Second attachment flanges 46A are formed at the open end of the second outer panel 46 to extend away from each other. The second attachment flanges 46A are joined to the outer side wall 42A and the rear flange 42D of the second outer pillar portion 42 from the outside of the vehicle cabin 14. Thus, the second pillar 40 has a closed section structure defined by the second outer pillar portion 42 and the second outer panel 46.

The rear end of the transparent window member 60 described later in the front-and-rear direction of the vehicle is joined, via a water-stop sealer 50, to the second attachment flange 46A joined to the rear flange 42D. The front end of a side glass 24 in the front-and-rear direction of the vehicle is joined, via a water-stop sealer 50, to the second attachment flange 46A joined to the outer side wall 42A.

First Reinforcement Member and Second Reinforcement Member

As illustrated in FIG. 1 to FIG. 3, the first pillar 32 and the second pillar 40 are coupled together in the front-and-rear direction of the vehicle by using the first reinforcement member 52 and the second reinforcement member 54. Each of the first reinforcement member 52 and the second reinforcement member 54 is made of a steel sheet, and is formed into an elongated shape so that the front-and-rear direction of the vehicle is a longitudinal direction. For example, each of the first reinforcement member 52 and the second reinforcement member 54 includes an inner panel and an outer panel (not illustrated) each substantially having a hat shape in vertical sectional view. The inner panel and the outer panel are joined together in the width direction of the vehicle to obtain a reinforcement member having a closed section structure.

The first reinforcement member 52 couples the first pillar 32 and the second pillar 40 together in the front-and-rear direction of the vehicle at a part corresponding to a boundary between the straight portion 30A and the curved portion 30B of the pillar 30. A stress caused by a load input in the event of front-end collision (or rear-end collision) of the vehicle concentrates on the part corresponding to the boundary between the straight portion 30A and the curved portion 30B of the pillar 30. By arranging the first reinforcement member 52 at the boundary between the straight portion 30A and the curved portion 30B, the part where the stress concentrates in the event of front-end collision (or rear-end collision) of the vehicle can be reinforced effectively.

In the first pillar 32, the part where the lower pillar portion 32A and the upper pillar portion 32B (roof side rail 12C2) are coupled together is located at the boundary between the straight portion 30A and the curved portion 30B of the pillar 30, and the strength structurally decreases at this part. The first reinforcement member 52 also has a function of reinforcing the part where the lower pillar portion 32A and the upper pillar portion 32B are coupled together, thereby effectively increasing the strength of the first pillar 32. In the first pillar 32, the part coupled to the first reinforcement member 52 and the part coupled to the roof header 12C1 are located at substantially the same height position. Thus, the first reinforcement member 52 is coupled to the roof header 12C1 via the first pillar 32.

The second reinforcement member 54 is arranged below the first reinforcement member 52 in the vertical direction of the vehicle, and couples the middle part of the first pillar 32 and the lower part of the second pillar 40 together in the front-and-rear direction of the vehicle. The second reinforcement member 54 has a function of increasing the rigidity and strength of the pillar 30 such that the load input to the first pillar 32 in the event of front-end collision (or rear-end collision) of the vehicle is transmitted to the second pillar 40.

Transparent Window Member

As illustrated in FIG. 1, the pillar 30 having the structure described above has a substantially rectangular opening 56 defined by the lower parts of the first pillar 32 and the second pillar 40, the first reinforcement member 52, and the second reinforcement member 54. The opening 56 is covered with the transparent window member 60 interposed between the first pillar 32 and the second pillar 40. The transparent window member 60 is made of glass or a transparent resin, and constitutes a side part of the vehicle cabin 14 in the width direction of the vehicle. Thus, the occupant in the vehicle cabin 14 can view the outside of the vehicle 10 through the transparent window member 60 at the opening 56 of the pillar 30.

Framework Member

As illustrated in FIG. 3, the upper end and the lower end of the pillar 30 having the structure described above are supported from the rear side of the vehicle by a framework member 62 that constitutes a framework of the body 12 of the vehicle 10. The framework member 62 includes a pair of right and left vertical pillar portions 64 and a reinforcement portion 66 that couples the upper ends of the vertical pillar portions 64 together in the width direction of the vehicle and couples the lower ends of the vertical pillar portions 64 together in the width direction of the vehicle. The framework member 62 has an annular shape when viewed in the front-and-rear direction of the vehicle.

The vertical pillar portions 64 are arranged away from each other in the width direction of the vehicle, and extend in an elongated shape along the vertical direction of the vehicle. The vertical pillar portions 64 constitute side parts of the framework member 62 in the width direction of the vehicle. Each vertical pillar portion 64 has a hollow shape defined by an inner panel 64A and an outer panel 64B. The inner panel 64A is arranged on an inner side in the width direction of the vehicle. The outer panel 64B is joined to the inner panel 64A from an outer side in the width direction of the vehicle.

The lower end of the vertical pillar portion 64 is joined to a rocker 26 and one end of a floor reinforcement 66B described later. The rocker 26 is arranged at a lower part of the side wall 12A of the vehicle 10. The upper end of the vertical pillar portion 64 is joined to the roof side rail 12C2 and one end of a roof reinforcement 66A described later.

The reinforcement portion 66 that couples the vertical pillar portions 64 together includes the roof reinforcement 66A that couples the upper ends of the vertical pillar portions 64 together, and the floor reinforcement 66B that couples the lower ends of the vertical pillar portions 64 together. The roof reinforcement 66A is a hollow columnar member that constitutes the framework of the roof 12C and extends in the width direction of the vehicle. Both ends of the roof reinforcement 66A in its extending direction are coupled to the upper ends of the vertical pillar portions 64 via coupling portions (not illustrated).

The floor reinforcement 66B is arranged below the floor 12B of the vehicle cabin 14 to serve as a reinforcement member for the floor 12B. The floor reinforcement 66B is a hollow columnar member extending in the width direction of the vehicle. Joint flanges (not illustrated) formed at both ends of the floor reinforcement 66B in its extending direction are joined to the inner panels 64A of the vertical pillar portions 64. Thus, the floor reinforcement 66B couples the lower ends of the vertical pillar portions 64 together in the width direction of the vehicle.

As illustrated in FIG. 1, the upper end of the first pillar 32 and the upper end of the second pillar 40 that constitute the upper end of the pillar 30 are joined to the upper end of the vertical pillar portion 64. The upper end of the first pillar 32 is a part where the roof side rail 12C2 and the vertical pillar portion 64 are joined together.

Third Reinforcement Member

A middle part of the vertical pillar portion 64 is coupled to the lower part of the second pillar 40 via a third reinforcement member 70. Similarly to the first reinforcement member 52 and the second reinforcement member 54, the third reinforcement member 70 is made of a steel sheet, and is formed into an elongated shape so that the front-and-rear direction of the vehicle is a longitudinal direction. For example, the third reinforcement member 70 includes an inner panel and an outer panel (not illustrated) each substantially having a hat shape in vertical sectional view. The inner panel and the outer panel are joined together in the width direction of the vehicle to obtain a reinforcement member having a closed section structure.

The third reinforcement member 70 is arranged at the same height position as that of the second reinforcement member 54. One end of the third reinforcement member 70 is coupled to the second reinforcement member via the second pillar 40. The other end of the third reinforcement member 70 is coupled to the middle part of the vertical pillar portion 64. Therefore, the load input to the first pillar 32 in the event of front-end collision (or rear-end collision) of the vehicle 10 is transmitted to the vertical pillar portion 64 via the second reinforcement member 54 and the third reinforcement member 70.

Actions and Effects

The vehicle pillar structure according to this embodiment includes the pillar 30 including the first pillar 32 extending along the outer end of the Fr glass 22 in the width direction of the vehicle, and the second pillar 40 arranged away from the first pillar 32 by the predetermined distance in the front-and-rear direction of the vehicle (substantial front-and-rear direction of the vehicle). In the pillar 30, the transparent window member 60 is interposed between the first pillar 32 and the second pillar 40. The transparent window member 60 covers the opening 56 defined by the first pillar 32 and the second pillar 40. For example, at the front part or the rear part of the vehicle 10, the occupant in the vehicle cabin 14 can view the outside of the vehicle 10 through the transparent window member 60 at the opening 56 of the pillar 30. Therefore, a blind spot of the pillar 30 is reduced for the occupant in the vehicle cabin 14. Thus, the visibility can be improved.

The pillar 30 has the curved shape defined by the straight portion 30A extending in the vertical direction of the vehicle (substantial vertical direction of the vehicle) in side view, and the curved portion 30B curved from the upper end of the straight portion 30A and extending in the front-and-rear direction of the vehicle. Since the upper part of the pillar 30 extends in the front-and-rear direction of the vehicle by the curved portion 30B, the vehicle cabin space can be increased as compared to a vehicle pillar inclined in a straight shape in side view.

In this embodiment, the pillar 30 is integrated with the roof side rail 12C2. Therefore, the load input to the pillar 30 in the event of, for example, front-end or rear-end collision of the vehicle 10 can efficiently be transmitted to the roof side rail 12C2 and the roof 12C.

Since the pillar 30 is curved at the boundary between the straight portion 30A and the curved portion 30B, the stress caused by the load input in the event of front-end or rear-end collision of the vehicle 10 concentrates on this boundary.

In the pillar 30 of this embodiment, the first reinforcement member 52 that couples the first pillar 32 and the second pillar 40 together is provided at the boundary between the straight portion 30A and the curved portion 30B. Therefore, the pillar 30 is structured such that the first reinforcement member 52 effectively reinforces the part where the stress concentrates in the event of front-end or rear-end collision of the vehicle 10. Thus, deformation of the pillar 30 can be suppressed in the event of front-end or rear-end collision of the vehicle 10.

In this embodiment, the pillar 30 can effectively be reinforced by coupling the roof header 12C1 to the part of the pillar 30 where the stress concentrates in the event of front-end or rear-end collision of the vehicle 10. Thus, the deformation of the pillar 30 is suppressed in the event of front-end or rear-end collision of the vehicle.

In this embodiment, the load input to the lower part of the pillar 30 in the event of front-end or rear-end collision of the vehicle 10 is distributed to the first pillar 32 and the second pillar 40 via the second reinforcement member 54. The lower part of the second pillar 40 is offset outward in the width direction of the vehicle with respect to the middle part of the first pillar 32. Therefore, the load input to the pillar 30 in the event of front-end or rear-end collision of the vehicle 10 can be distributed outward in the width direction of the vehicle. Thus, deformation at the front or rear of the vehicle can be suppressed in the event of front-end or rear-end collision of the vehicle 10.

In this embodiment, the framework member 62 is arranged on the rear side of the pillar 30 in the front-and-rear direction of the vehicle (inner side in the front-and-rear direction of the vehicle). The side part of the framework member 62 in the width direction of the vehicle is constituted by the vertical pillar portion 64 extending in the vertical direction of the vehicle. In the pillar 30, the upper ends of the first pillar 32 and the second pillar 40 are coupled to the vertical pillar portion 64. Therefore, the load input to the pillar 30 in the event of front-end or rear-end collision of the vehicle is transmitted to the framework member 62 arranged on the rear side. Thus, the rigidity and strength of the pillar 30 of the vehicle 10 can be increased.

In this embodiment, the load input to the lower part of the second pillar 40 of the pillar 30 in the event of front-end or rear-end collision of the vehicle 10 is transmitted to the vertical pillar portion 64 of the framework member 62 via the third reinforcement member 70. Thus, deformation of the second pillar 40 and deformation at the front or rear of the vehicle 10 are suppressed in the event of front-end or rear-end collision of the vehicle 10.

In this embodiment, the framework member 62 includes the vertical pillar portions 64 and the reinforcement portion 66 that couples the upper ends and the lower ends of the vertical pillar portions 64 together in the width direction of the vehicle. Therefore, the framework member 62 has the annular shape when viewed in the front-and-rear direction of the vehicle, and the rigidity and strength are increased. Thus, the rigidity and strength of the pillar 30 of the vehicle 10 can further be increased, and the deformation of the pillar 30 can be suppressed in the event of front-end or rear-end collision of the vehicle 10.

In this embodiment, the sectional area of the curved portion 30B of the pillar 30 is set larger than the sectional area of the straight portion 30A of the pillar 30. More specifically, the sectional areas of the upper parts of the first pillar 32 and the second pillar 40 are set larger than the sectional areas of the lower parts of the first pillar 32 and the second pillar 40. Thus, the visibility can be secured by reducing the thicknesses of the lower parts of the first pillar 32 and the second pillar 40 near the height position of the line of sight of the occupant in the vehicle cabin 14. Further, the requirement for the rigidity of the pillar 30 can be satisfied by increasing the thicknesses of the upper parts of the first pillar 32 and the second pillar 40 near the ceiling of the vehicle cabin 14.

For example, when the sectional areas of the upper parts of the first pillar 32 and the second pillar 40 are secured sufficiently, deformation of the front part or the rear part of the vehicle 10 can effectively be suppressed in the event of overturn of the vehicle 10 due to collision with an obstacle. That is, when the vehicle 10 is overturned, a load is input to the upper part of the pillar 30 and the roof 12C from one side in the width direction of the vehicle. When the sectional areas of the upper parts of the first pillar 32 and the second pillar 40 are secured sufficiently, the sectional rigidity of the upper part of the pillar 30 is increased. Thus, the deformation of the front part or the rear part of the vehicle can be suppressed in the event of overturn of the vehicle.

In this embodiment, the first reinforcement member 52 and the roof header 12C1 are coupled together via the first pillar 32 of the pillar 30. Therefore, in the event of overturn of the vehicle, a load input to the roof 12C located on the side of the vehicle 10 where collision occurs can be distributed, via the first reinforcement member 52 and the roof header 12C1, to the pillar 30 located on the side where collision does not occur.

In the embodiment described above, the pillar 30 is integrated with the roof side rail 12C2 by forming the upper pillar portion 32B of the first pillar 32 from the front end of the roof side rail 12C2. The present disclosure is not limited to this case. The pillar 30 may be integrated with the roof side rail 12C2 by forming the upper pillar portion 32B of the first pillar 32 from the first outer pillar portion 34 and the first inner pillar portion 36 that constitute the lower pillar portion 32A, and coupling the upper end of the first pillar 32 to the front end of the roof side rail 12C2.

In the embodiment described above, the framework member 62 is formed into the annular shape by the vertical pillar portions 64 and the reinforcement portion 66 when viewed in the front-and-rear direction of the vehicle. The present disclosure is not limited to this case. The framework member 62 may include only the right and left vertical pillar portions 64.

In the embodiment described above, the vehicle pillar structure is applied to the front part of the vehicle 10. A similar vehicle pillar structure may be applied to the rear part of the vehicle 10.

What is claimed is:

1. A vehicle pillar structure, comprising:
    a vehicle pillar including
        a first pillar extending along an outer end of a windshield glass in a width direction of a vehicle, and
        a second pillar disposed away from the first pillar by a predetermined distance in a substantial front-and-rear direction of the vehicle;
    a first reinforcement member; and
    a transparent window member through which an outside of the vehicle is viewable, the transparent window member being interposed between the first pillar and the second pillar and covering an opening defined by the first pillar and the second pillar, wherein
each of the first pillar and the second pillar has a curved shape defined by a straight portion extending in a substantial vertical direction of the vehicle in side view, and a curved portion curved from an upper end of the straight portion and extending in the substantial front-and-rear direction of the vehicle,
the first reinforcement member couples a first boundary between the straight portion and the curved portion included in the first pillar to a second boundary between the straight portion and the curved portion included in the second pillar, and
the second boundary between the straight portion and the curved portion included in the second pillar is located lower than the first boundary between the straight portion and the curved portion included in the first pillar in the substantial vertical direction.

2. The vehicle pillar structure according to claim 1, wherein
the curved portion of the first pillar is integrated with a roof side rail, the roof side rail constituting a framework of a roof serving as a ceiling of a vehicle cabin of the vehicle and disposed at an outer end of the roof in the width direction of the vehicle to extend in the substantial front-and-rear direction of the vehicle.

3. The vehicle pillar structure according to claim 1, wherein
one end of a roof header is coupled to the first boundary, the roof header constituting a framework of a roof serving as a ceiling of a vehicle cabin of the vehicle, and disposed at an outer end of the roof in the substantial front-and-rear direction of the vehicle to extend in the width direction of the vehicle.

4. The vehicle pillar structure according to claim 1, wherein
a middle part of the straight portion of the first pillar and a lower part of the straight portion of the second pillar are coupled together by a second reinforcement member, and
the lower part of the straight portion of the second pillar is offset outward in the width direction of the vehicle with respect to the middle part of the straight portion of the first pillar.

5. The vehicle pillar structure according to claim 1, wherein
a framework member is disposed on an inner side of the vehicle pillar in the substantial front-and-rear direction of the vehicle, the framework member including a vertical pillar portion extending in the substantial vertical direction,
the vertical pillar portion constitutes a side part of the framework member in the width direction of the vehicle, and
an upper end of the curved portion of the first pillar and an upper end of the curved portion of the second pillar are coupled to the vertical pillar portion.

6. The vehicle pillar structure according to claim 5, wherein
a lower part of the straight portion of the second pillar is coupled to the vertical pillar portion of the framework member via a third reinforcement member.

7. The vehicle pillar structure according to claim 5, wherein
the framework member has an annular shape when viewed in the substantial front-and-rear direction of the vehicle, the annular shape being defined by a pair of the vertical pillar portions and a reinforcement portion that couples upper ends of the pair of the vertical pillar portions together in the width direction of the vehicle and couples lower ends of the pair of the vertical pillar portions together in the width direction of the vehicle.

8. The vehicle pillar structure according to claim 6, wherein
the framework member has an annular shape when viewed in the substantial front-and-rear direction of the vehicle, the annular shape being defined by a pair of the vertical pillar portions and a reinforcement portion that couples upper ends of the pair of the vertical pillar portions together in the width direction of the vehicle and couples lower ends of the pair of the vertical pillar portions together in the width direction of the vehicle.

9. The vehicle pillar structure according to claim 1, wherein in at least one of the first pillar or the second pillar, a sectional area of the curved portion is larger than a sectional area of the straight portion.

10. The vehicle pillar structure according to claim 1, wherein
the straight portion of the first pillar includes a first closed sectional shape, and
the straight portion of the second pillar includes a second closed sectional shape having a smaller area than the first closed sectional shape.

11. The vehicle pillar structure according to claim 1, wherein
an entirety of the first reinforcement member is disposed between (i) the first boundary between the straight portion and the curved portion included in the first pillar and (ii) the second boundary between the straight portion and the curved portion included in the second pillar.

12. The vehicle pillar structure according to claim 1, wherein
a distance between the straight portion of the first pillar and the straight portion of the second pillar in the substantial front-and-rear direction of the vehicle gradually increases from the upper ends of the straight portions toward lower ends of the straight portions opposite to the upper ends of the straight portions.

13. The vehicle pillar structure according to claim 4, wherein
the lower part of the straight portion of the second pillar is at a same height as the middle part of the straight portion of the first pillar, and
an entirety of the second reinforcement member is disposed between the middle part of the straight portion of the first pillar and the lower part of the straight portion of the second pillar.

* * * * *